United States Patent
Lu et al.

(10) Patent No.: US 12,255,344 B2
(45) Date of Patent: Mar. 18, 2025

(54) BATTERY PACK AND COMBINATION OF THE BATTERY PACK AND A POWER TOOL

(71) Applicant: Nanjing Chervon Industry Co., Ltd., Nanjing (CN)

(72) Inventors: Wei Lu, Nanjing (CN); Zhiyang Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 779 days.

(21) Appl. No.: 17/406,179

(22) Filed: Aug. 19, 2021

(65) Prior Publication Data
US 2022/0069404 A1 Mar. 3, 2022

(30) Foreign Application Priority Data
Aug. 27, 2020 (CN) .......................... 202010879966.2

(51) Int. Cl.
*H01M 50/247* (2021.01)
*H01M 50/204* (2021.01)
*H01M 50/262* (2021.01)
*H01M 50/502* (2021.01)
*H01M 50/543* (2021.01)

(52) U.S. Cl.
CPC ....... *H01M 50/247* (2021.01); *H01M 50/204* (2021.01); *H01M 50/262* (2021.01); *H01M 50/502* (2021.01); *H01M 50/543* (2021.01); H01M 2220/30 (2013.01)

(58) Field of Classification Search
CPC ............. H01M 50/204; H01M 50/284; H01M 50/296; H01M 50/298; H01M 50/502; H01M 50/503; H01M 50/519; H01M 50/545; H01M 50/583
See application file for complete search history.

(56) References Cited

U.S. PATENT DOCUMENTS

2007/0111087 A1* 5/2007 Tsai ..................... H01M 50/291
429/97
2021/0167456 A1* 6/2021 Kurihara ............. H01M 10/658

* cited by examiner

*Primary Examiner* — Jack Chiang
*Assistant Examiner* — Aric Lin
(74) *Attorney, Agent, or Firm* — Greenberg Traurig, LLP (57) ABSTRACT

A battery pack includes a casing, a cell group, a bracket, cell connection pieces, and output terminals. A plane where the output terminals of the battery pack are located is defined as an upper plane, a plane where the output terminals of the cell group are located is defined as a front plane, and a plane perpendicular to the upper plane and the front plane is defined as a side plane. One of the cell connection pieces includes a bracket-fixed surface, a cell connection surface, and a power supply output surface. The bracket-fixed surface is fixed on the bracket and parallel to the side plane. The cell connection surface is connected to the power supply output terminals of the cell group and parallel to the front plane. The power supply output surface is connected to the output terminals and parallel to the upper plane.

13 Claims, 9 Drawing Sheets

BATTERY PACK AND COMBINATION OF THE BATTERY PACK AND A POWER TOOL

RELATED APPLICATION INFORMATION

This application claims the benefit under 35 U.S.C. § 119(a) of Chinese Patent Application No. CN 202010879966.2, filed on Aug. 27, 2020, which is incorporated by reference in its entirety herein.

TECHNICAL FIELD

The present disclosure relates to a battery pack and, in particular, to a battery pack applicable to power tools and cell connection pieces thereof.

BACKGROUND

A battery pack is widely used in power tools to provide power for the power tools. At present, a lithium battery pack, as a wireless battery pack, is convenient to use, has the advantages of high energy density, safety, and a small volume, and has become the preferred power source for the power tools. With the increase of the rated current of the power tools, the battery pack is required to be able to provide a larger discharge current and has a structure that can adapt to the requirement of supplying power with a large current.

SUMMARY

In one aspect of the disclosure, a battery pack is provided. The battery pack includes a casing; a cell group accommodated in the casing; a bracket configured to fix the cell group; cell connection pieces connected to power supply output terminals of the cell group; and output terminals of the battery pack electrically connected to the cell connection pieces. A plane where the output terminals of the battery pack are located is defined as an upper plane, a plane where the power supply output terminals of the cell group are located is defined as a front plane, and a plane perpendicular to the upper plane and the front plane is defined as a side plane. One of the cell connection pieces includes: a bracket-fixed surface fixed on the bracket and parallel to the side plane; a cell connection surface connected to the power supply output terminals of the cell group and parallel to the front plane; and a power supply output surface connected to the output terminals of the battery pack and parallel to the upper plane. The bracket-fixed surface is connected to the cell connection surface, and the power supply output surface is connected to the bracket-fixed surface and/or the cell connection surface.

In one example, a maximum height of the bracket-fixed surface is less than or equal to a height of the front plane.

In one example, the power supply output surface includes two output surfaces independent of each other, wherein one of the two output surfaces is connected to the cell connection surface and another of the two output surfaces is connected to the bracket-fixed surface.

In one example, the cell connection surface is provided with through holes.

In one example, the output terminals of the battery pack include positive output terminals, negative output terminals, and a communication terminal, the cell connection pieces include a positive cell connection piece and a negative cell connection piece, the battery pack further includes a first intermediate connection piece, a second intermediate connection piece, a third intermediate connection piece, a first fuse, and a second fuse, the positive output terminals are sequentially connected to the second intermediate connection piece, the first fuse, the first intermediate connection piece, the positive cell connection piece, and positive electrodes of cells such that a positive discharge circuit of the battery pack is formed, the positive output terminals are sequentially connected to the second fuse, the positive cell connection piece, and the positive electrodes of the cells such that a positive charging circuit of the battery pack is formed, and the negative output terminals are sequentially connected to the third intermediate connection piece, the negative cell connection piece, and negative electrodes of the cells such that a negative charging circuit and a negative discharge circuit of the battery pack are formed.

In one example, the positive output terminals include positive discharge terminals used as positive output terminals of the positive discharge circuit and a positive charge terminal used as a positive output terminal of the positive charging circuit.

In one example, the cell connection pieces are integrally formed.

In one example, the bracket-fixed surface is provided with a connection insertion piece, the bracket is provided with an insertion piece interface for matching with the connection insertion piece.

In one example, the power supply output surface is provided with a connection insertion piece, the battery pack further include a intermediate connection piece formed with an insertion piece interface for matching with the connection insertion piece, the intermediate connection piece is located on the front plane, and the intermediate connection piece is fixedly connected to the bracket by screws.

In another aspect of the disclosure, a combination of a battery pack and a power tool is provided. The combination includes the power tool including a tool body and input terminals disposed on the tool body; and the battery pack, wherein the battery pack is provided with output terminals of the battery pack, which are configured to adapt to the input terminals of the power tool to supply power to the power tool. The battery pack further includes: a casing; a cell group accommodated in the casing and configured to supply power to the power tool; a bracket configured to fix the cell group; and cell connection pieces connected to power supply output terminals of the cell group. The output terminals of the battery pack are electrically connected to the cell connection pieces. A plane where the output terminals of the battery pack are located is defined as an upper plane, a plane where the power supply output terminals of the cell group are located is defined as a front plane, and a plane perpendicular to the upper plane and the front plane is defined as a side plane. One of the cell connection pieces includes: a bracket-fixed surface fixed on the bracket and parallel to the side plane; a cell connection surface connected to the power supply output terminals of the cell group and parallel to the front plane; and a power supply output surface connected to the output terminals of the battery pack and parallel to the upper plane. The bracket-fixed surface is connected to the cell connection surface, and the power supply output surface is connected to the bracket-fixed surface and/or the cell connection surface.

In one example, a maximum height of the bracket-fixed surface is less than or equal to a height of the front plane.

In one example, the power supply output surface includes two output surfaces independent of each other, wherein one of the two output surfaces is connected to the cell connection surface and another of the two output surfaces is connected to the bracket-fixed surface.

In one example, the cell connection surface is provided with through holes.

In one example, the cell connection pieces are integrally formed.

In one example, the bracket-fixed surface is provided with a connection insertion piece, the bracket is provided with an insertion piece interface for matching with the connection insertion piece.

In one example, the power supply output surface is provided with a connection insertion piece, the battery pack further include a intermediate connection piece formed with an insertion piece interface for matching with the connection insertion piece, the intermediate connection piece is located on the front plane, and the intermediate connection piece is fixedly connected to the bracket by screws.

DETAILED DESCRIPTION

Figure 1:
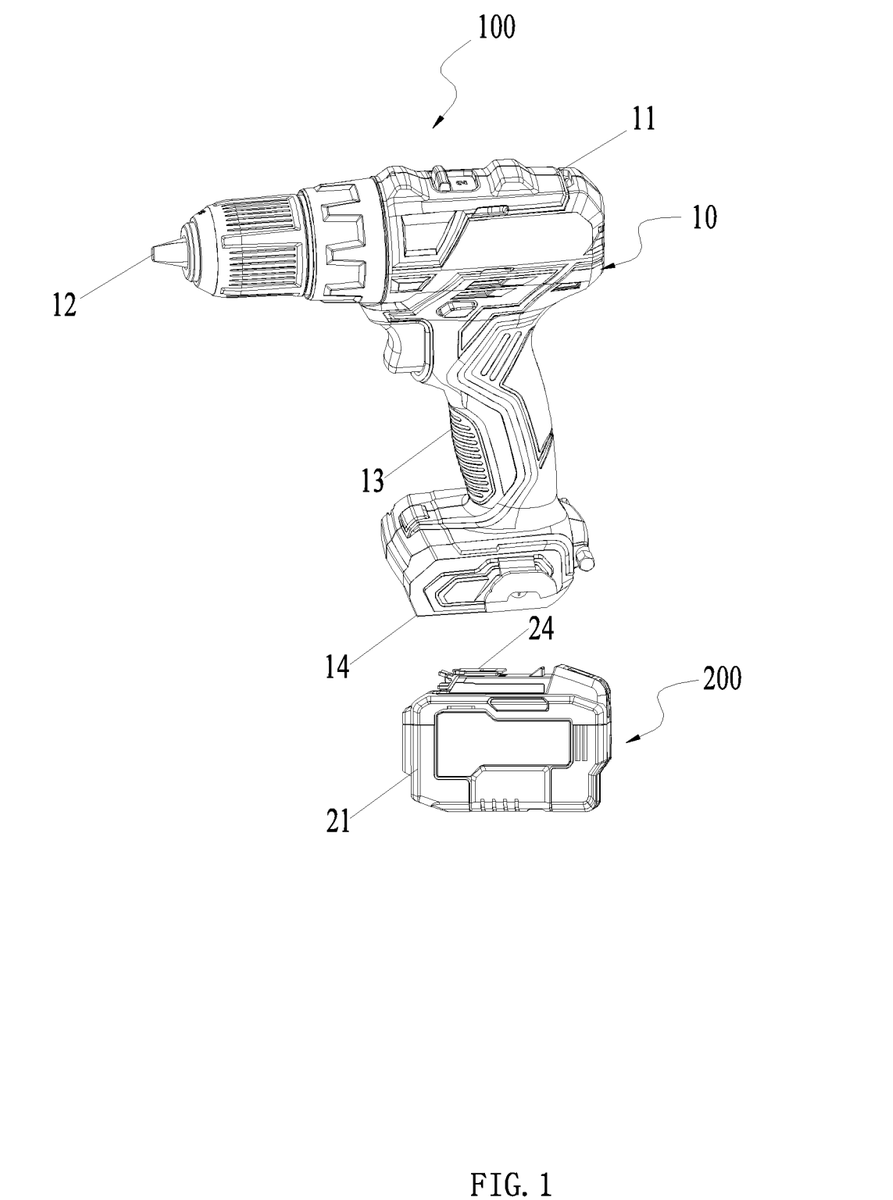
FIG. 1 is a schematic view of a battery pack and a power tool.

FIG. 1 shows a power tool 100 and a battery pack 200 that can adapt to the power tool 100 and supply power to the power tool 100. In this example, the power tool 100 is an electric drill, and it is to be understood that the present application may be applied to other types of power tools 100 rather than being limited to the disclosed examples. The other types of power tools 100 include, but are not limited to, an electric hammer, a sander, an angle grinder, an electric wrench, and an electric saw.

The power tool 100 includes a tool body 10 and input terminals 14 disposed on the tool body 10, and the battery pack 200 is provided with output terminals 24 of the battery pack. The output terminals 24 of the battery pack are configured to adapt to the input terminals 14 of the power tool 100 to supply power to the power tool 100.

As shown in FIG. 1, the tool body 10 includes a casing 11, a functional piece 12, and a holding portion 13.

The functional piece 12 is configured to implement a function of the power tool 100, and the functional piece 12 is driven to operate by a motor. The motor is disposed in the casing 11 and is not shown in the figure. Different power tools 100 have different functional pieces 12. For example, for the angle grinder, the functional piece 12 is a grinding plate configured to achieve the function of grinding or cutting. The functional piece 12 is connected to the motor. Specifically, the functional piece 12 is connected to the motor through an output shaft and a transmission mechanism. In an example, the motor may be a three-phase brushless direct current (DC) motor and includes a rotor, a stator, and a motor shaft, where the output shaft and the motor shaft are connected through the transmission mechanism so that a driving force of the motor is transmitted to the output shaft.

The tool body 10 further includes the holding portion 13, where the holding portion 13 may be configured as an independent part or formed by the casing 11, and the holding portion 13 may be held by a user for the user to operate the power tool 100.

The power tool 100 is provided with the input terminals 14 at a lower end of the holding portion 13.

Figure 2:
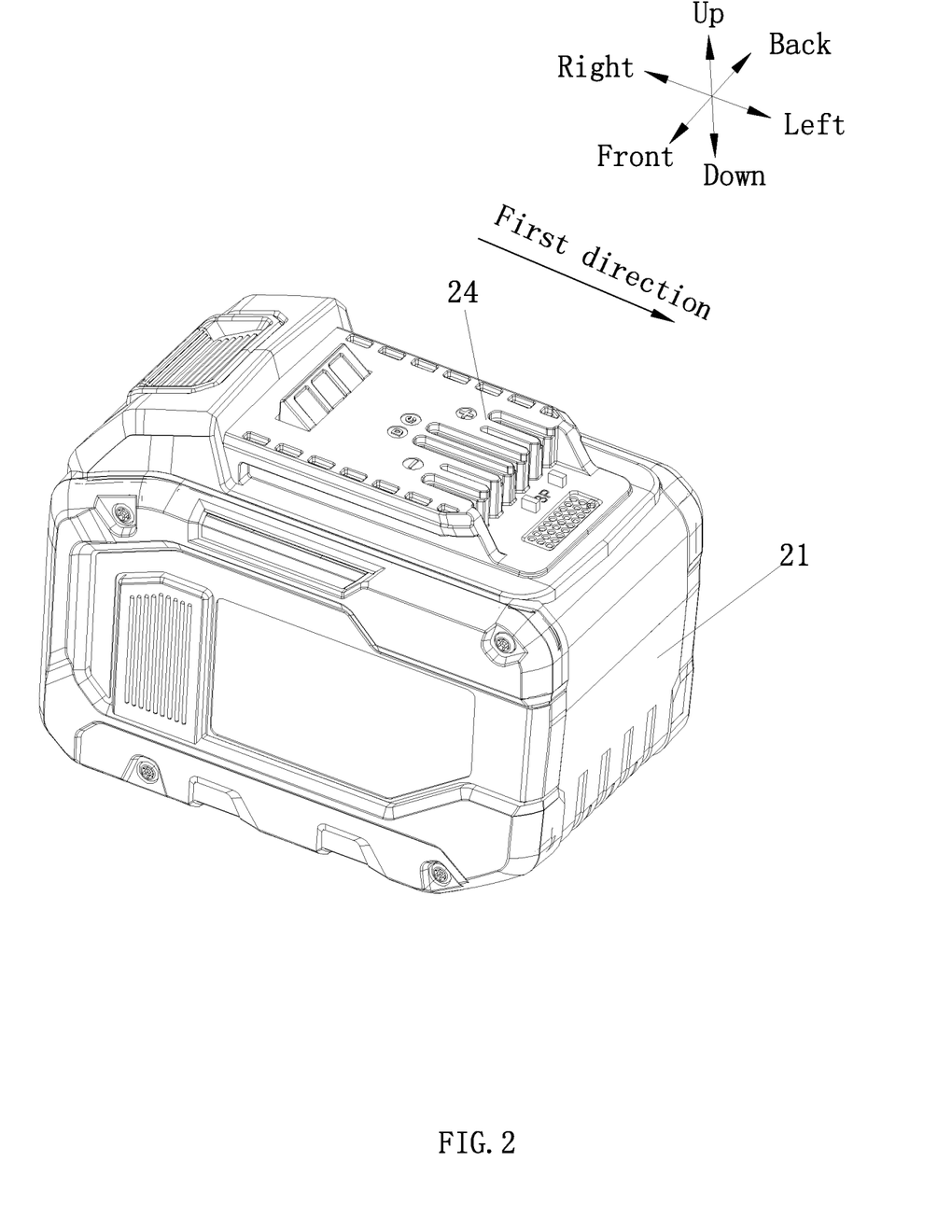
FIG. 2 is a structural view of a battery pack as one example.
Figure 3A:
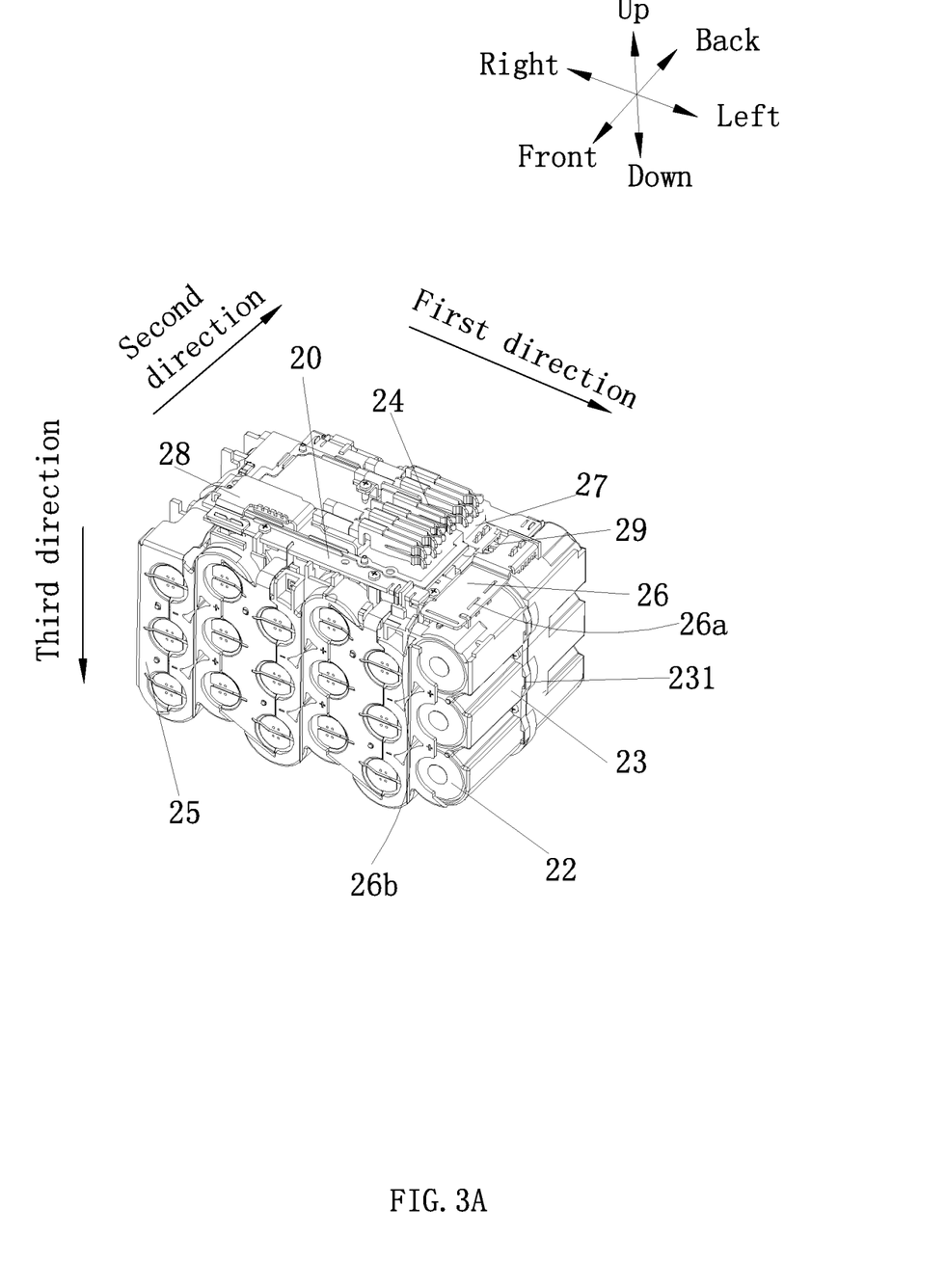
FIG. 3A is a schematic view of an internal structure of the battery pack in FIG. 1 with a casing and a positive cell connection piece removed.
Figure 3B:
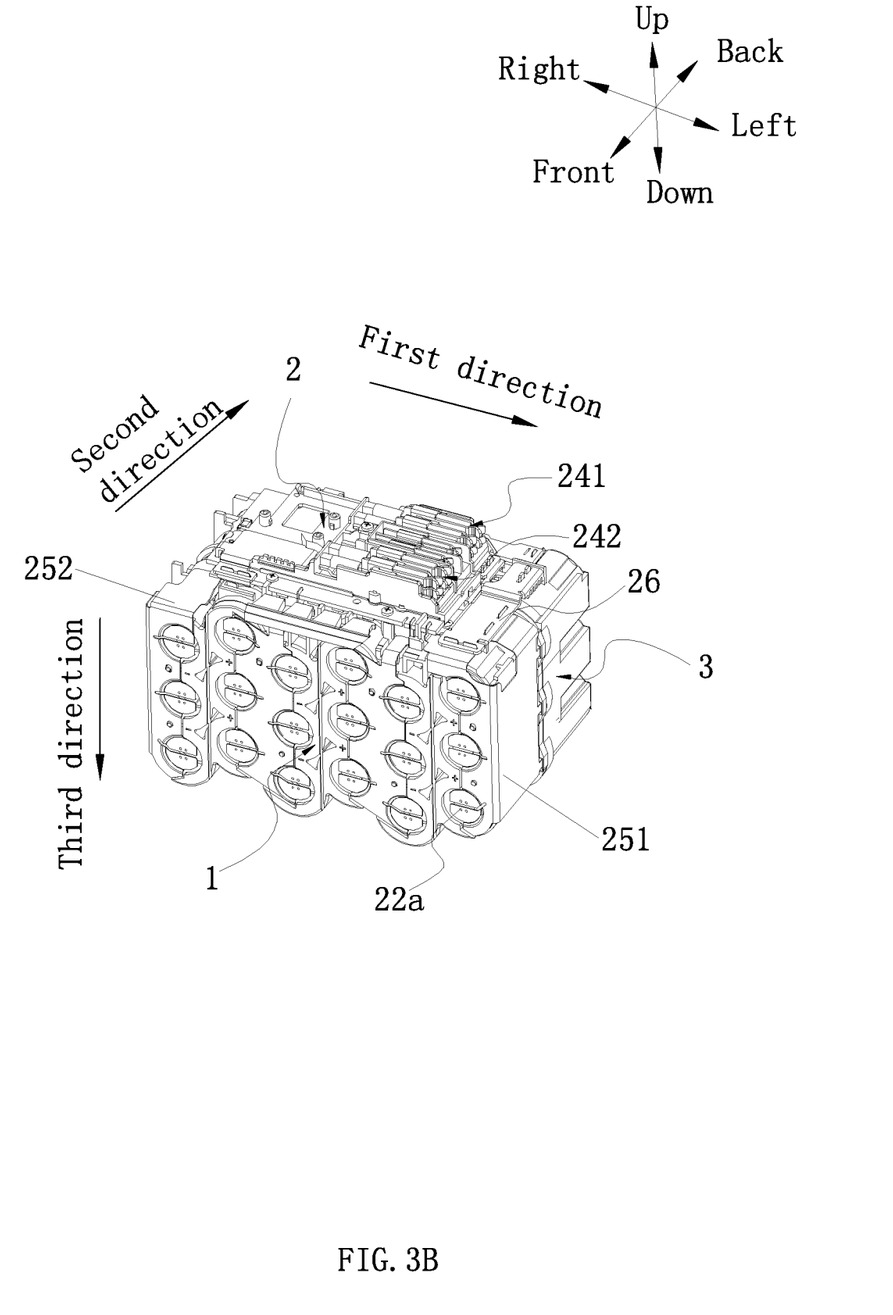
FIG. 3B is a schematic view of an internal structure of the battery pack in FIG. 1 with a casing removed.
Figure 4:
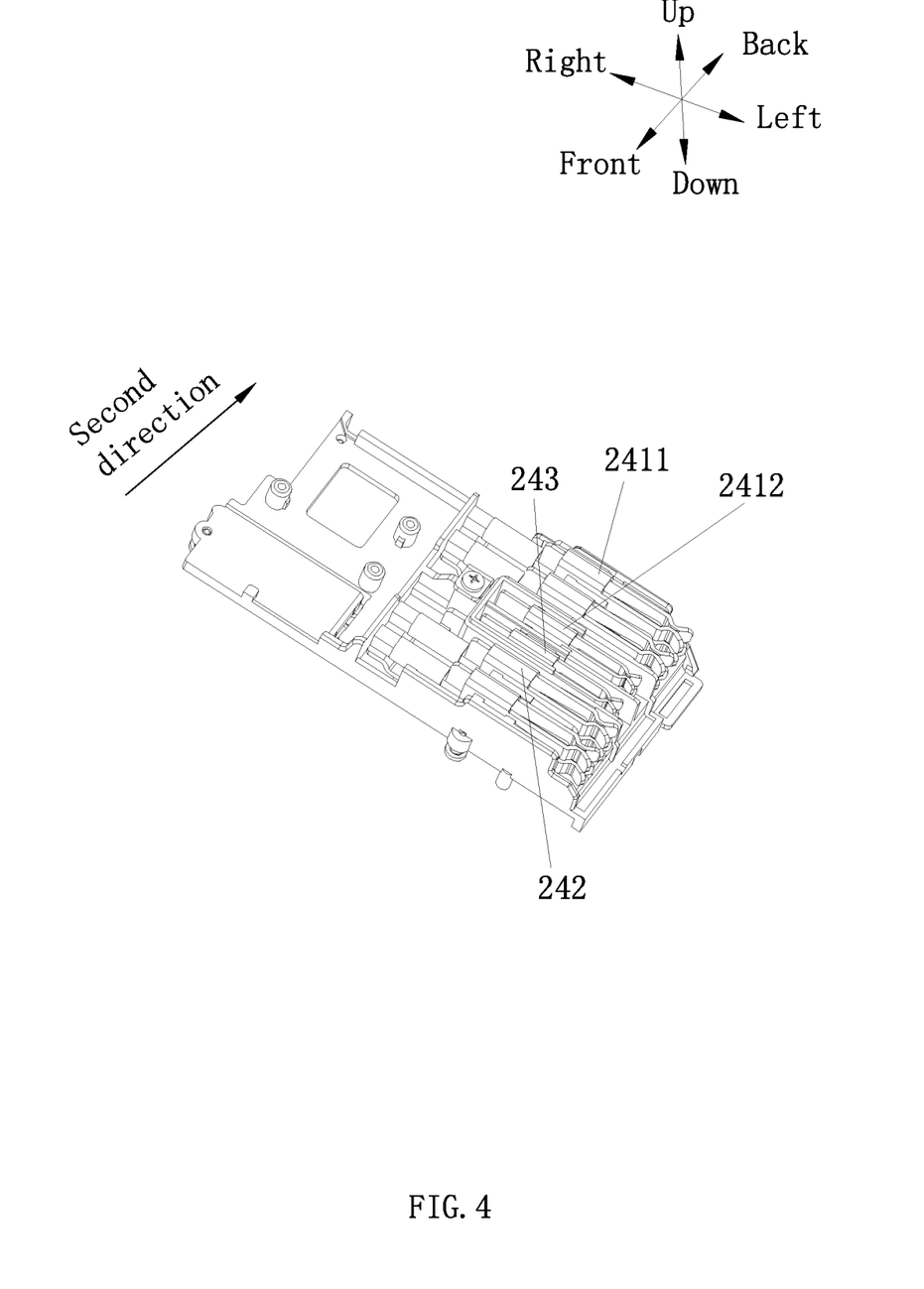
FIG. 4 is a structural view of output terminals of the battery pack shown in FIG. 3A.

In examples of the present application, six directions of up, down, left, right, front, and back, as well as a first direction from right to left, a second direction from front to back, and a third direction from up to down shown in FIGS. 2 to 4 are defined.

The battery pack 200 is configured to supply power to the power tool 100. As shown in FIGS. 1 to 3B, the battery pack 200 includes a casing 21 of the battery pack, a cell group 22, a bracket 23, the output terminals 24 of the battery pack, cell connection pieces 25, a first intermediate connection piece 26, a second intermediate connection piece 27, a third intermediate connection piece 28, a first fuse 29, a circuit board 20, and the like.

The casing 21 of the battery pack forms an accommodation space to fix and accommodate the cell group 22.

The battery pack 200 further includes the output terminals 24 of the battery pack. In some examples, the output terminals 24 of the battery pack are formed on an upper side of the casing 21 of the battery pack and configured to enable the battery pack 200 to be detachably connected to the power tool 100. The output terminals 24 of the battery pack include positive output terminals 241, negative output terminals 242, and a communication terminal 243. The battery pack 200 supplies power to the power tool 100 through the positive output terminals 241 and the negative output terminals 242 and communicates with the power tool 100 through the communication terminal 243. In an example, the positive output terminals 241 may be divided into positive discharge terminals 2411 and a positive charge terminal 2412, where the positive discharge terminals 2411 are two terminals connected in parallel, and the positive charge terminal 2412 is one terminal; the negative output terminals 242 are two terminals connected in parallel; and the communication terminal 243 is one terminal. In an example, the output terminals 24 of the battery pack are displayed as interfaces corresponding to six output terminals on the casing 21 of the battery pack. In an alternative example, the casing 21 may be provided with more or fewer interfaces according to the electrical characteristics of the battery pack 200. It is to be understood that the interfaces corresponding to the output terminals 24 on the casing 21 of the battery pack and the interfaces corresponding to the input terminals 14 of the power tool 100 may be detachably and slidably connected along the first direction shown in FIG. 2.

In this example, as shown in FIGS. 3A to 4, along the second direction shown in the figures, six terminals corresponding to the output terminals 24 of the battery pack are two negative output terminals 242 connected in parallel, the communication terminal 243, the positive charge terminal 2412, and the positive discharge terminals 2411, respectively. The positive discharge terminals 2411 and the negative output terminals 242 are discharge output terminals of the battery pack, and the positive charge terminal 2412 and the negative output terminals 242 are used as charge terminals of the battery pack. In this example, the positive output terminals 241 and the negative output terminals 242 have different structures from the communication terminal 243.

The circuit board 20 is disposed between the output terminals 24 of the battery pack and the cell group 22. The circuit board 20 is provided with a power management module and the preceding output terminals 24 of the battery pack. The power management module is configured to perform power management on the battery pack 200 to manage the charge and discharge of the battery pack 200.

The cell group 22 is composed of multiple cells connected in series, multiple cells connected in parallel, or multiple cells connected in series and in parallel. In some examples, each cell 221 has a flat band-like structure, the multiple cells 221 are stacked along an up-and-down direction, and the cell 221 may also be bent into an arc shape. In other examples, the cell 221 has a cylindrical structure. It is to be understood that the present application is not limited to the disclosed examples, and the structure of the cell 221 is not limited herein.

It is to be noted that the cells in the cell group 22 are connected through the cell connection pieces 25. Multiple cell connection pieces 25 configured to connect the cells and disposed on the cell group 22 may be divided into two categories. Along the first direction shown in FIG. 3B, a first cell connection piece and a last cell connection piece carry all currents in the battery pack and belong to excessively-large-current cell connection pieces; and the other connection pieces between the first cell connection piece and the last cell connection piece carry only part of the currents in the battery pack and belong to non-large-current connection pieces. In this example, the structure and material of the non-large-current connection piece are not limited herein. The connection pieces that carry large currents not only need to be capable of carrying the large currents but also need to have a certain heat dissipation effect, so a relatively high requirement is imposed on the structure thereof.

In the following description, the cell connection pieces 25 refer to the excessively-large-current connection pieces.

In the examples of the present application, three planes are defined in the space of the preceding six directions. As shown in FIG. 3B, a plane where the output terminals 24 of the battery pack are located is defined as an upper plane 2, a plane where power supply output terminals 22a of the cell group 22 are located is defined as a front plane 1, and a plane perpendicular to the upper plane 2 and the front plane 1 is defined as a side plane 3. It is to be understood that there are two side planes 3, and along the first direction shown in FIG. 3B, the two side planes are a left side plane and a right side plane in sequence. After the preceding three planes are defined, each cell connection piece 25 is accordingly divided into three surfaces: a bracket-fixed surface 2511 fixed on the bracket 23 and parallel to the side plane 3, a cell connection surface 2512 connected to the power supply output terminals 22a of the cell group 22 and parallel to the front plane 1, and a power supply output surface 2513 connected to the output terminals 24 of the battery pack and parallel to the upper plane 2. The bracket-fixed surface 2511 is connected to the cell connection surface 2512, and the power supply output surface 2513 is connected to the bracket-fixed surface 2511 and/or the cell connection surface 2512.

In an example, the cell connection pieces 25 are an integral metal sheet with a thickness of about 0.25 mm.

In an example, the power supply output surface 2513 parallel to the upper plane 2 may be divided into two independent output surfaces, that is, the cell connection piece 25 adopts two outputs to carry a large current in the battery pack and increase a total current carrying surface so that an ability of the cell connection piece for the large current to flow through is ensured.

Figure 5:
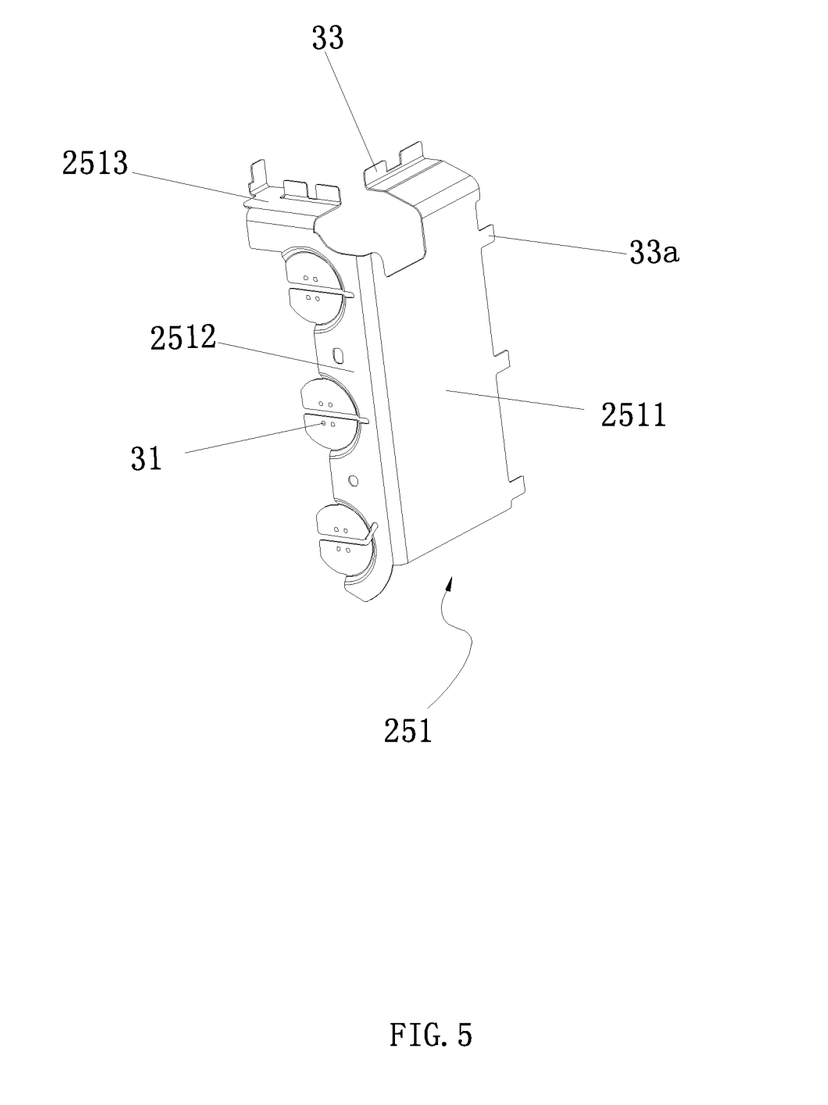
FIG. 5 is a structural view of one cell connection piece shown in FIG. 3B.
Figure 6:
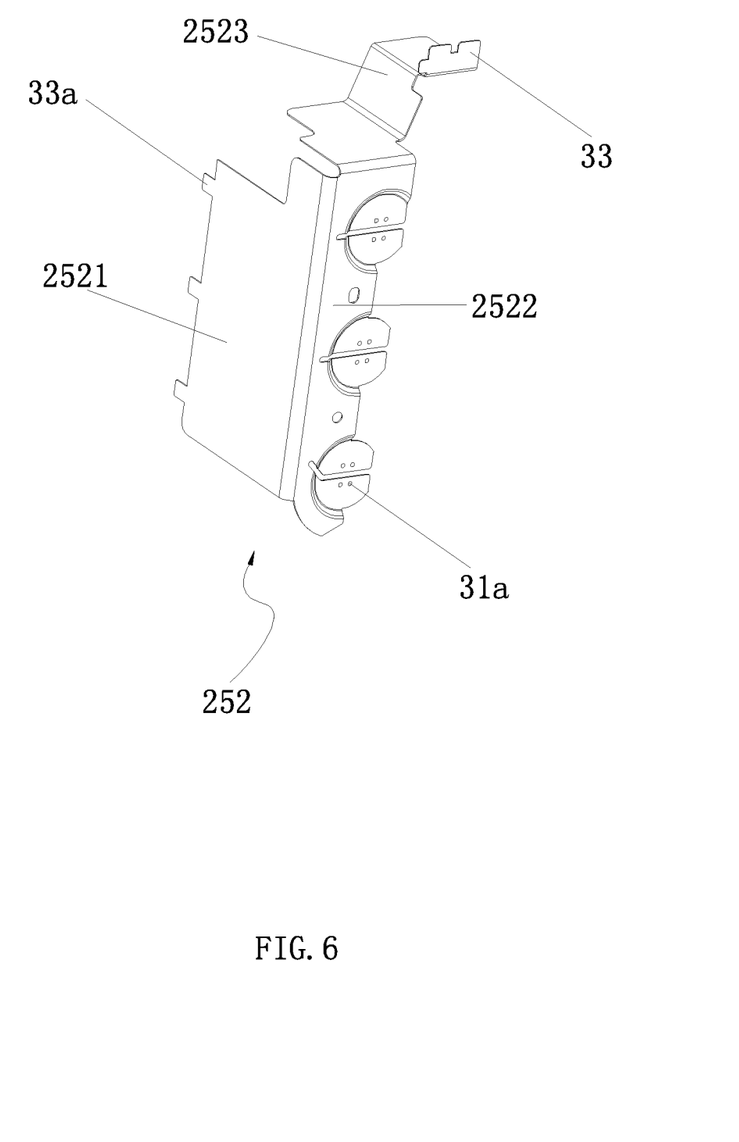
FIG. 6 is a structural view of another cell connection piece shown in FIG. 3B.

It is to be noted that on the premise that the installation of other components of the battery pack or the normal operation of the battery pack is not affected, an area of the bracket-fixed surface 2511 of the cell connection piece 25 may be increased as much as possible so that the heat dissipation effect of the cell connection piece 25 is improved. As shown in FIG. 3B, a total height of the bracket-fixed surface 2511 along the third direction is defined as a maximum height of the bracket-fixed surface 2511, and a total width of the bracket-fixed surface 2511 along the second direction is defined as a maximum width of the bracket-fixed surface 2511. The maximum height of the bracket-fixed surface 2511 may be less than or equal to a height of the front plane 1, and the maximum width of the bracket-fixed surface 2511 is less than or equal to a length from an intersection between the front plane 1 and the side plane 3 to an insertion piece interface 231. The insertion piece interface 231 is an insertion hole disposed on the bracket 23 and configured to fix the bracket-fixed surface 2511. The number of insertion piece interface 231 is related to a design of an insertion end of the bracket-fixed surface 2511 that is inserted into the bracket 23, where the insertion end of the bracket-fixed surface 2511 is an end farther from the cell connection surface 2512. For example, as shown in FIGS. 5 and 6, the insertion end of the bracket-fixed surface 2511 that is inserted into the bracket 23 is designed with three insertion pieces, and then three corresponding insertion piece interface 231 are provided. In an example, the bracket-fixed surface 2511 may also be designed with hollow grids, lines, or other patterns that can increase a surface area so that the heat dissipation effect of the bracket-fixed surface 2511 is further improved.

In an example, the cell connection pieces 25 include a positive cell connection piece 251 connected to positive electrodes of the cells and a negative cell connection piece 252 connected to negative electrodes of the cells.

In an example, as shown in FIG. 5, the positive cell connection piece 251 includes the bracket-fixed surface 2511, the cell connection surface 2512, and the power supply output surface 2513. The power supply output surface 2513 is divided into two independent output surfaces, where one output surface is connected to the bracket-fixed surface 2511, and the other output surface is connected to the cell connection surface 2512. A sum of currents flowing through the preceding two output surfaces is a total current that the connection piece 252 can carry. A width of a narrowest part of each output surface determines a magnitude of a current that the output surface can carry. A relationship between magnitudes of currents that the two output surfaces can carry is not limited in the examples of the present application. An end of the power supply output surface 2513 farther from the bracket-fixed surface 2511 and the cell connection surface 2512 is used as an output connection end at which through holes for welding or connection insertion pieces for insertion may be provided. As shown in FIG. 5, the connection insertion pieces at the output connection end of the power supply output surface 2513 are perpendicular to the output surface. Optionally, the connection insertion pieces may also be other insertion pieces that are of any shapes and perpendicular or not perpendicular to the power supply output surface 2513. In an example, the cell connection surface 2512 is provided with through holes 31a configured to allow for connection of the cells in the cell group 22, and the number of through holes 31a is directly proportional to the number of the cells connected to the cell connection surface 2512. As shown in FIG. 5, each cell corresponds to four through holes 31a, and then the cell connection surface 2512 is provided with three groups of through holes, that is, twelve through holes 31a. Optionally, the cell connection surface 2512 may be further provided with several screw holes so that it is convenient to fix the connection piece through screws.

In an example, as shown in FIG. 6, the negative cell connection piece 252 includes a bracket-fixed surface 2521, a cell connection surface 2522, and a power supply output surface 2523. The bracket-fixed surface 2511 and the cell connection surface 2512 of the connection piece are designed in the same manner as those of the positive cell connection piece 251, and a difference between the negative cell connection piece 252 and the positive cell connection piece 251 lies in power supply output surfaces of the two connection pieces. Only one output surface of the power supply output surface 2523 is connected to the cell connection surface 2522, and an end of the power supply output surface 2523 farther from the cell connection surface 2522 is designed as an output end with a stepped structure.

In an example, the power supply output surface 2523 of the negative cell connection piece 252 may also be consistent with the power supply output surface 2513 of the positive cell connection piece 251, both of which have two independent output surfaces, one output surface is connected to the cell connection surface, and the other output surface is connected to the bracket-fixed surface.

In an example, as shown in FIG. 3A, the battery pack 200 further includes the first intermediate connection piece 26, the second intermediate connection piece 27, the third intermediate connection piece 28, the first fuse 29, and a second fuse. The two fuses are respectively used for fuse protection in a charging circuit and a discharge circuit. The first fuse 29 is a large-current fuse on the discharge circuit of the battery pack and connected between the first intermediate connection piece 26 and the second intermediate connection piece 27. The second fuse is a charge fuse on the charging circuit of the battery pack, the second fuse is disposed on the circuit board 20 and connected to the positive charge terminal 2412, and the second fuse is mainly used for fuse protection in the case where the battery pack is charged and does not participate in protection in the case where the battery pack is discharged.

Figure 7:
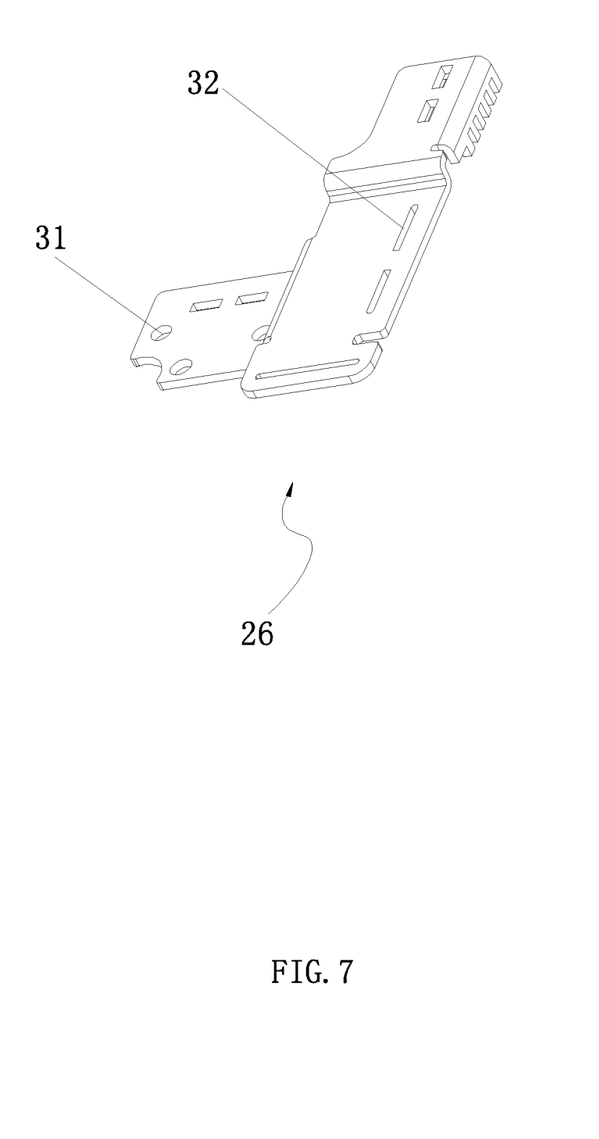
FIG. 7 is a structural view of a first intermediate connection piece shown in FIG. 3A.
Figure 8:
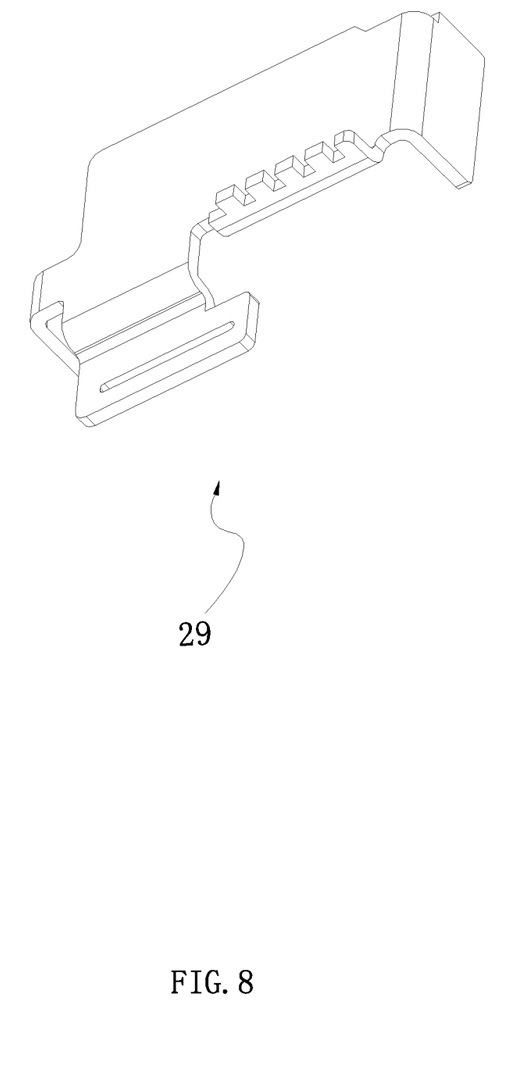
FIG. 8 is a structural view of a third intermediate connection piece shown in FIG. 3A.

In an example, as shown in FIGS. 7 and 8, on the premise that the overall design of the battery pack is not affected, the widths of the first intermediate connection piece 26 and the third intermediate connection piece 28 may be increased as much as possible, and an excessively wide part is bent into a zigzag or in another shape so that heat dissipation areas of the intermediate connection pieces are increased.

In an example, the positive output terminals 241 are sequentially connected to the second intermediate connection piece 27, the first fuse 29, the first intermediate connection piece 26, the positive cell connection piece 251, and the positive electrodes of the cells so that a positive discharge circuit of the battery pack 200 is formed. Specifically, the positive output terminals 241 that form the positive discharge circuit are the positive discharge terminals 2411.

In an example, the positive output terminals 241 are sequentially connected to the second fuse 30, a charge line on the circuit board 20, a welding point of the positive cell connection piece 251 and the circuit board 20, the positive cell connection piece 251, and the positive electrodes of the cells so that a positive charging circuit of the battery pack 200 is formed. Specifically, the positive output terminal 241 that forms the positive charging circuit is the positive charge terminal 2412.

In an example, the negative output terminals 242 are sequentially connected to a fourth intermediate connection piece (disposed below the negative output terminals 242 and soldered to the circuit board 20), a sampling resistor and the charge line on the circuit board 20, the third intermediate connection piece 28, the negative cell connection piece 242, and the negative electrodes of the cells so that a negative charging circuit or a negative discharge circuit of the battery pack 200 is formed. That is, the negative charging circuit and the negative discharge circuit of the battery pack 200 are the same circuit.

It is to be noted that in the preceding circuits, the connection between components may be insertion, welding, or a combination thereof. According to different connection manners, through holes for welding, connection insertion pieces, or insertion piece interfaces may be disposed accordingly. The specific connection manner and the corresponding connection setting are not limited in this example. As shown in FIGS. 5 to 8, a circular through hole 31 is used for welding, a square insertion piece interface 32 is used for insertion, and a connection insertion piece 33 is used for fitting with the insertion piece interface 32 on the corresponding component for insertion.

The bracket-fixed surface 2511 is provided with a connection insertion piece 33a, the bracket 23 is provided with an insertion piece interface 231 for matching with the connection insertion piece 33a. The power supply output surface 2513 is provided with connection insertion piece 33, the first intermediate connection piece 26 is formed with insertion piece interface 26a for matching with the connection insertion pieces 33, the first intermediate connection piece 26 is located on the upper plane 2, and the first intermediate connection piece 26 is fixedly connected to the bracket 23 by screws 26b.

The above illustrates and describes basic principles, main features, and advantages of the present disclosure. It is to be understood by those skilled in the art that the preceding examples do not limit the present disclosure in any form, and technical solutions obtained by means of equivalent substitution or equivalent transformation fall within the protection scope of the present disclosure.

What is claimed is:

1. A battery pack, comprising:
   a casing;
   a cell group accommodated in the casing;
   a bracket configured to fix the cell group;
   cell connection pieces connected to power supply output terminals of the cell group; and
   output terminals of the battery pack electrically connected to the cell connection pieces;
   wherein a plane where the output terminals of the battery pack are located is defined as an upper plane, a plane where the power supply output terminals of the cell group are located is defined as a front plane, and a plane perpendicular to the upper plane and the front plane is defined as a side plane,
   wherein one of the cell connection pieces comprises:
   a bracket-fixed surface fixed on the bracket and parallel to the side plane;
   a cell connection surface connected to the power supply output terminals of the cell group and parallel to the front plane; and a power supply output surface connected to the output terminals of the battery pack and parallel to the upper plane, wherein the bracket-fixed surface is connected to the cell connection surface and the power supply output surface is connected to the bracket-fixed surface and/or the cell connection surface, and wherein the power supply output surface comprises two output surfaces independent of each other, one of the two output surfaces is connected to the cell connection surface, and another of the two output surfaces is connected to the bracket-fixed surface.

2. The battery pack of claim 1, wherein a maximum height of the bracket-fixed surface is less than or equal to a height of the front plane.

3. The battery pack of claim 1, wherein the cell connection surface is provided with through holes configured to allow for connection of cells in the cell group.

4. The battery pack of claim 1, wherein the output terminals of the battery pack comprise positive output terminals, negative output terminals, and a communication terminal, the cell connection pieces comprise a positive cell connection piece and a negative cell connection piece, the battery pack further comprises a first intermediate connection piece, a second intermediate connection piece, a third intermediate connection piece, a first fuse, and a second fuse, the positive output terminals are sequentially connected to the second intermediate connection piece, the first fuse, the first intermediate connection piece, the positive cell connection piece, and positive electrodes of cells such that a positive discharge circuit of the battery pack is formed, the positive output terminals are sequentially connected to the second fuse, the positive cell connection piece, and the positive electrodes of the cells such that a positive charging circuit of the battery pack is formed, and the negative output terminals are sequentially connected to the third intermediate connection piece, the negative cell connection piece, and negative electrodes of the cells such that a negative charging circuit and a negative discharge circuit of the battery pack are formed.

5. The battery pack of claim 4, wherein the positive output terminals comprise positive discharge terminals used as positive output terminals of the positive discharge circuit and a positive charge terminal used as a positive output terminal of the positive charging circuit.

6. The battery pack of claim 1, wherein the cell connection pieces are integrally formed.

7. The battery pack of claim 1, wherein the bracket-fixed surface is provided with a connection insertion piece and the bracket is provided with an insertion piece interface for matching with the connection insertion piece.

8. The battery pack of claim 1, wherein the power supply output surface is provided with a connection insertion piece, the battery pack further comprise an intermediate connection piece formed with an insertion piece interface for matching with the connection insertion piece, the intermediate connection piece is located on the upper plane, and the intermediate connection piece is fixedly connected to the bracket by screws.

9. A combination of a battery pack and a power tool, comprising:

the power tool comprising a tool body and input terminals disposed on the tool body; and the battery pack is provided with output terminals which are configured to adapt to the input terminals of the power tool to supply power to the power tool;

wherein the battery pack further comprises:
 a casing;
 a cell group accommodated in the casing configured to supply power to the power tool;
 a bracket configured to fix the cell group; and
 cell connection pieces connected to power supply output terminals of the cell group, wherein the output terminals of the battery pack are electrically connected to the cell connection pieces, wherein a plane where the output terminals of the battery pack are located is defined as an upper plane, a plane where the power supply output terminals of the cell group are located is defined as a front plane, and a plane perpendicular to the upper plane and the front plane is defined as a side plane, wherein one of the cell connection pieces comprises:
 a bracket-fixed surface fixed on the bracket and parallel to the side plane;
 a cell connection surface connected to the power supply output terminals of the cell group and parallel to the front plane; and
 a power supply output surface connected to the output terminals of the battery pack and parallel to the upper plane, wherein the bracket-fixed surface is connected to the cell connection surface and the power supply output surface is connected to the bracket-fixed surface and/or the cell connection surface, wherein the bracket-fixed surface is provided with a connection insertion piece and the bracket is provided with an insertion piece interface for matching with the connection insertion piece, and wherein the power supply output surface comprises two output surfaces independent of each other, one of the two output surfaces is connected to the cell connection surface, and another of the two output surfaces is connected to the bracket-fixed surface.

10. The combination of claim 9, wherein a maximum height of the bracket-fixed surface is less than or equal to a height of the front plane.

11. The combination of claim 9, wherein the cell connection surface is provided with through holes configured to allow for connection of cells in the cell group.

12. The combination of claim 9, wherein the cell connection pieces are integrally formed.

13. The combination of claim 9, wherein the power supply output surface is provided with a connection insertion piece, the battery pack further comprise an intermediate connection piece formed with an insertion piece interface for matching with the connection insertion piece, the intermediate connection piece is located on the upper plane, and the intermediate connection piece is fixedly connected to the bracket by screws.

* * * * *